United States Patent
Maitland

(10) Patent No.: US 9,669,798 B1
(45) Date of Patent: Jun. 6, 2017

(54) EXPANDABLE PROTECTIVE COVERING FOR A SEATBELT

(71) Applicant: Jabulani Maitland, Yonkers, NY (US)

(72) Inventor: Jabulani Maitland, Yonkers, NY (US)

(*) Notice: Subject to any disclaimer, the term of this patent is extended or adjusted under 35 U.S.C. 154(b) by 0 days.

(21) Appl. No.: 15/066,803

(22) Filed: Mar. 10, 2016

(51) Int. Cl.
*B60R 22/00* (2006.01)
*B60R 22/28* (2006.01)

(52) U.S. Cl.
CPC .............. *B60R 22/28* (2013.01); *B60R 22/00* (2013.01)

(58) Field of Classification Search
CPC .... B60R 22/00; B60R 22/28; B60R 2022/006
See application file for complete search history.

(56) References Cited

U.S. PATENT DOCUMENTS

| | | | | |
|---|---|---|---|---|
| 4,699,401 A * | 10/1987 | Saenz | ...................... | B60R 22/00 224/602 |
| 4,786,080 A * | 11/1988 | Jay | ........................... | B60R 22/14 280/808 |
| 4,878,277 A * | 11/1989 | Portuese | ............ | A44B 11/2576 24/579.11 |
| 5,005,865 A | 4/1991 | Kruse | | |
| 5,215,333 A * | 6/1993 | Knight | ................... | B60R 22/024 24/306 |
| 5,911,479 A * | 6/1999 | Atkinson | ................ | B60R 22/00 297/482 |
| 6,086,158 A * | 7/2000 | Zeoli | ...................... | B60R 22/024 297/482 |
| 6,322,149 B1 * | 11/2001 | Conforti | ............... | B60R 22/024 297/482 |
| 6,322,150 B1 | 11/2001 | Harper | | |
| 6,557,895 B2 * | 5/2003 | Haack | ...................... | B60R 22/14 280/751 |
| 6,935,700 B1 | 8/2005 | Nerette | | |
| 7,445,245 B2 * | 11/2008 | Beczkowski | ........... | B60R 22/00 280/801.1 |
| 7,445,293 B2 * | 11/2008 | Smith | ................... | B60N 2/2812 24/614 |
| 7,591,512 B2 * | 9/2009 | You | ......................... | B60R 22/24 280/801.1 |
| 8,562,076 B2 * | 10/2013 | Currier | ................. | B60R 22/105 297/482 |
| 9,015,949 B2 * | 4/2015 | Bernardo | ................ | B60R 22/10 29/897.2 |

* cited by examiner

*Primary Examiner* — Philip Gabler
(74) *Attorney, Agent, or Firm* — Stevenson IP, LLC

(57) ABSTRACT

An expandable protective covering for a seatbelt including a substantially rectangular seatbelt cover having an expandable middle portion disposed between a pair of end portions. A slot is continuously disposed within the seatbelt cover from a left side of a left end of the pair of end portions to a right side of a right end of the pair of end portions. Each of a pair of locking mechanisms has a locking button disposed on a front surface of each of the right end and the left end, respectively, and a release opening disposed on the back surface of each of the right end and the left end, respectively. A seatbelt is configured to be slidably disposed within the slot. The locking button is both depressable into the release opening and releasable out of the release opening in order to selectively secure and release the seatbelt from within the slot.

4 Claims, 4 Drawing Sheets

EXPANDABLE PROTECTIVE COVERING FOR A SEATBELT

BACKGROUND OF THE INVENTION

Various types of seatbelt attachments are known in the prior art. However, what has been needed is an expandable protective covering for a seatbelt including a substantially rectangular seatbelt cover having an expandable middle portion disposed between a pair of end portions and a slot continuously disposed within the seatbelt cover from a left side of a left end of the pair of end portions to a right side of a right end of the pair of end portions. What has been further needed is for each of a pair of locking mechanisms to have a locking button disposed on a front surface of each of the right end and the left end, respectively, and a release opening disposed on the back surface of each of the right end and the left end, respectively. A seatbelt is configured to be slidably disposed within the slot. Lastly, what has been needed is for the locking button to be both depressable into the release opening and releasable out of the release opening in order to selectively secure and release the seatbelt from within the slot. The expandable protective covering for a seatbelt is different from other seatbelt attachments, since it is specifically structured to expand to cover a seatbelt within the slot in order to alleviate the tension of the seatbelt from the chest and waist area of a wearer. The covering is ideal for women who are pregnant or for those who have had abdominal surgery. Furthermore, the covering provides not only a greater level of comfort to the wearer, but acts as a safety feature as well, since it helps to prevent burns, cuts and bruises to the wearer during an automobile accident.

FIELD OF THE INVENTION

The present invention relates to seatbelt attachments, and more particularly, to an expandable protective covering for a seatbelt.

SUMMARY OF THE INVENTION

The general purpose of the present expandable protective covering for a seatbelt, described subsequently in greater detail, is to provide an expandable protective covering for a seatbelt which has many novel features that result in an expandable protective covering for a seatbelt which is not anticipated, rendered obvious, suggested, or even implied by prior art, either alone or in combination thereof.

To accomplish this, the present expandable protective covering for a seatbelt includes a substantially rectangular seatbelt cover having an expandable middle portion disposed between a pair of end portions. The middle portion of the seatbelt cover is optionally a foam material to ensure a comfortable fit around a waist of a wearer. Each of the pair of end portions of the seatbelt cover is optionally rubberized. Each of the middle portion and the pair of end portions has a flattened top side and a flattened bottom side. The stretchable middle portion has an accordion shaped front side and an accordion shaped back side, and each of the pair of end portions has a flattened front surface and a flattened back surface. A right end of the pair of end portions has a curved right top edge, a curved right bottom edge, and a right side. A left end of the pair of end portions has a curved left top edge, a curved left bottom edge, and a left side. A slot is continuously disposed within the seatbelt cover from the left side of the left end to the right side of the right end and from proximal each of the curved left top edge of the left end and the curved right top edge of the right end to each of the curved left bottom edge of the left end and the curved right bottom edge of the right end. A height of the slot substantially conforms to a height of a seatbelt, and a width of the slot substantially conforms to a width of the seatbelt.

The expandable protective covering for a seatbelt further includes a pair of locking mechanisms including a right locking mechanism and a left locking mechanism. Each of the right locking mechanism and the left locking mechanism has a cylindrical locking button medially disposed on the front surface of each of the right end and the left end, respectively, and a tapered cylindrical release opening medially disposed on the back surface of each of the right end and the left end, respectively. Each of the locking button and the release opening is continuously disposed through the front surface and the back surface, respectively, to the slot. A circumference of the locking button substantially conforms to a circumference of the release opening.

The seatbelt is configured to be slidably disposed within the slot. The locking button of each of the right locking mechanism and the left locking mechanism is selectively depressable into the release opening of each of the right locking mechanism and the left locking mechanism, respectively, in order to selectively secure the seatbelt within the slot. The locking button of each of the right locking mechanism and the left locking mechanism is also selectively releasable out of the release opening of each of the right locking mechanism and the left locking mechanism, respectively, in order to selectively release the seatbelt from within the slot.

The middle portion of the seatbelt cover has an expandable length that is optionally in a range of 10 inches to 32 inches. The expandability of the middle portion of the seatbelt cover allows the wearer to selectively increase the length of the seatbelt cover over the seatbelt when the seatbelt is in use, in order to better cushion the user from the seatbelt. The pair of locking mechanisms ensures that the seatbelt can be easily secured and, alternately, released from within the seatbelt cover.

Thus has been broadly outlined the more important features of the present expandable protective covering for a seatbelt so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
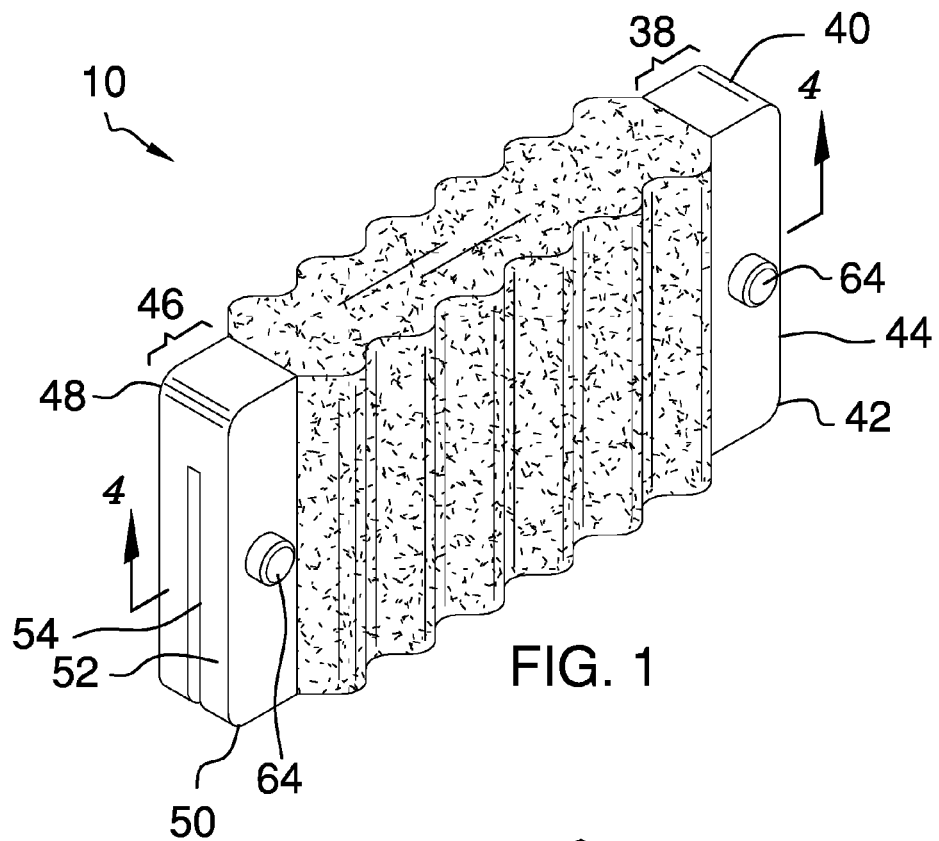
FIG. 1 is a front isometric view showing a seat belt cover in a retracted position.
Figure 2:
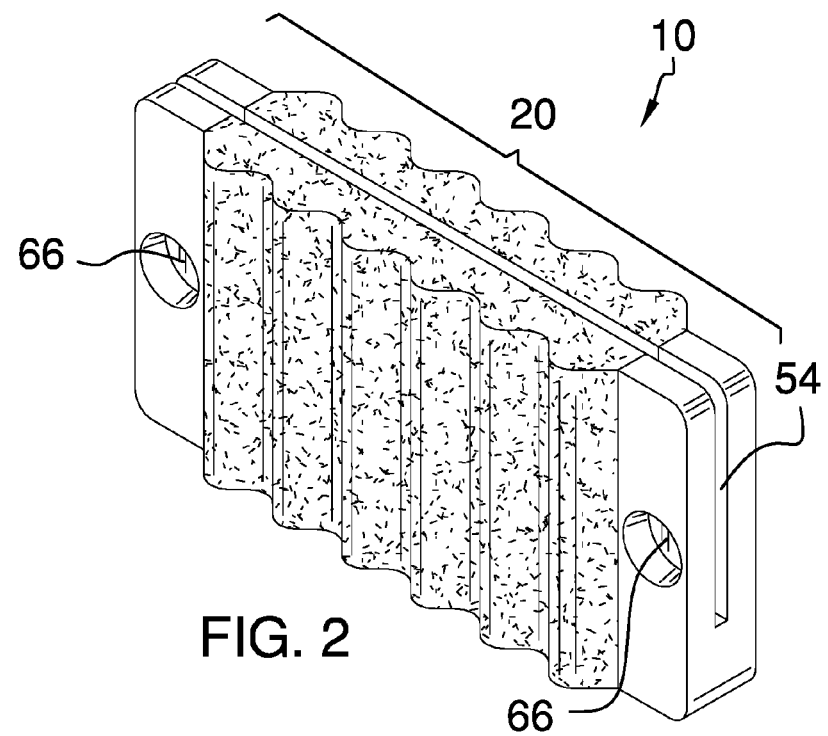
FIG. 2 is a bottom isometric view.
Figure 3:
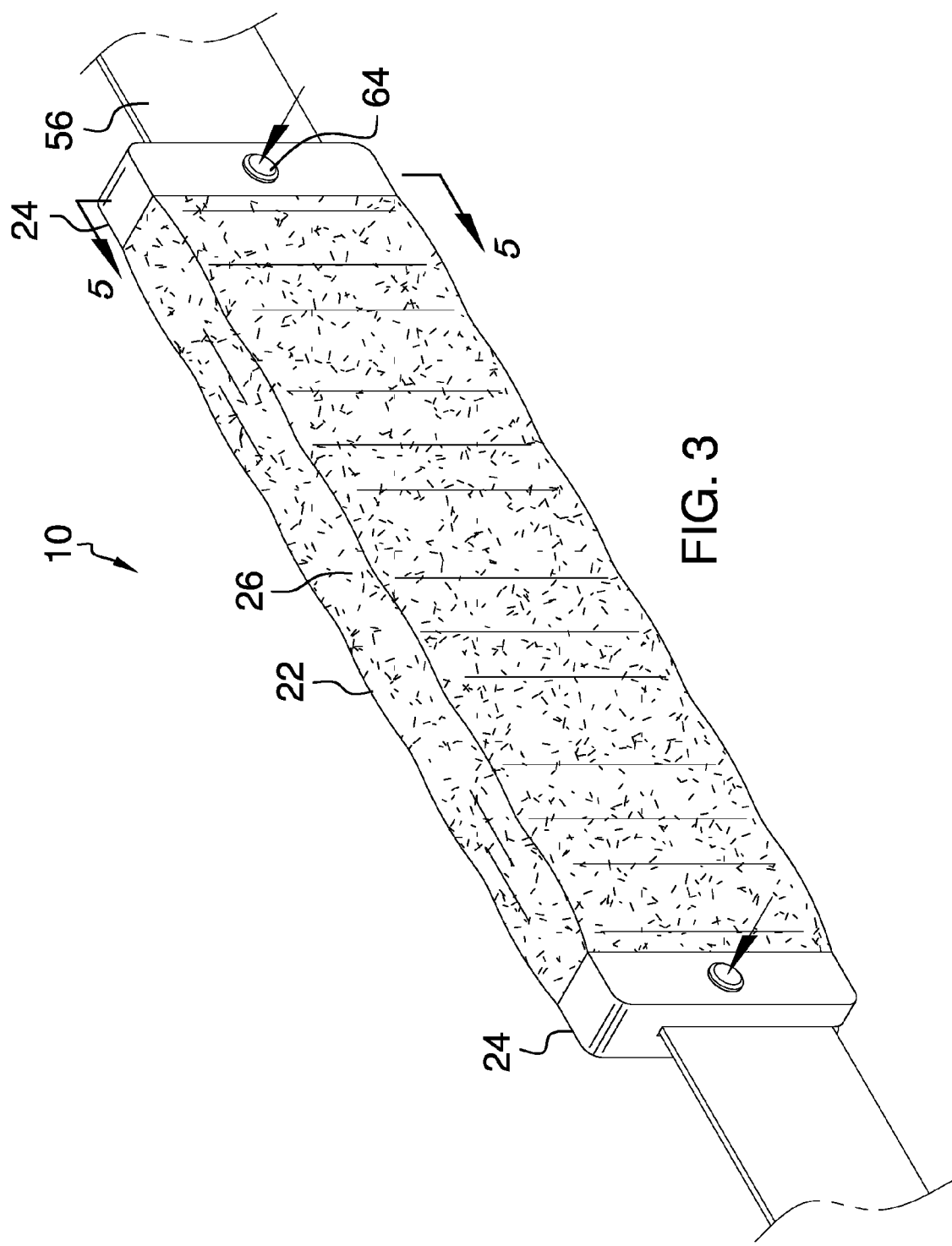
FIG. 3 is front isometric view showing the seat belt cover in an extended position.
Figure 4:
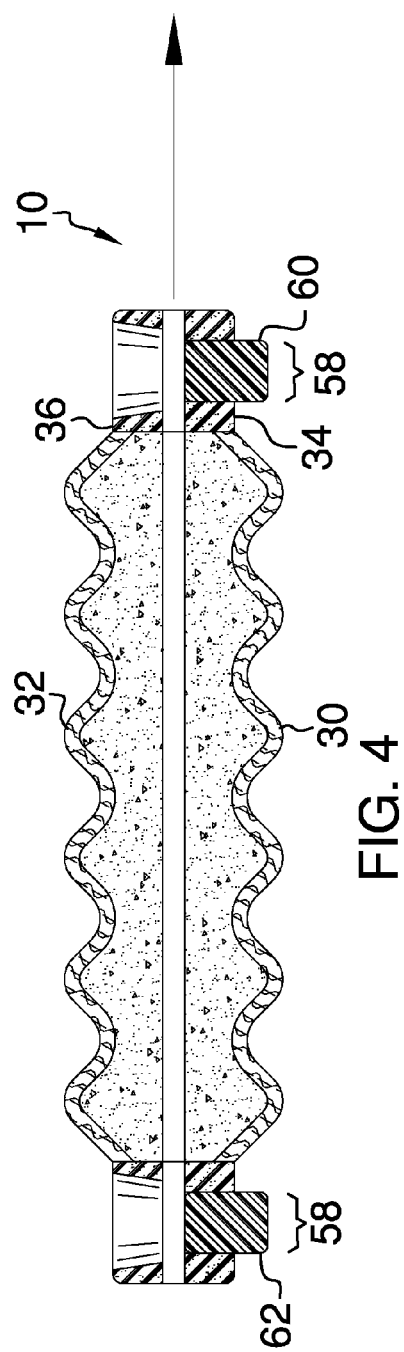
FIG. 4 is a cross-sectional view taken along line 4-4 of FIG. 1.
Figure 5:
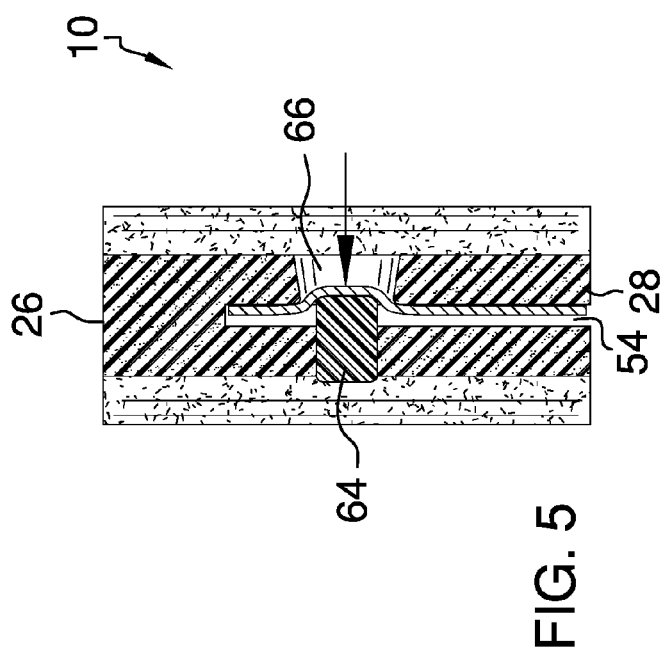
FIG. 5 is a cross-sectional view taken along line 5-5 of FIG. 3.
Figure 6:
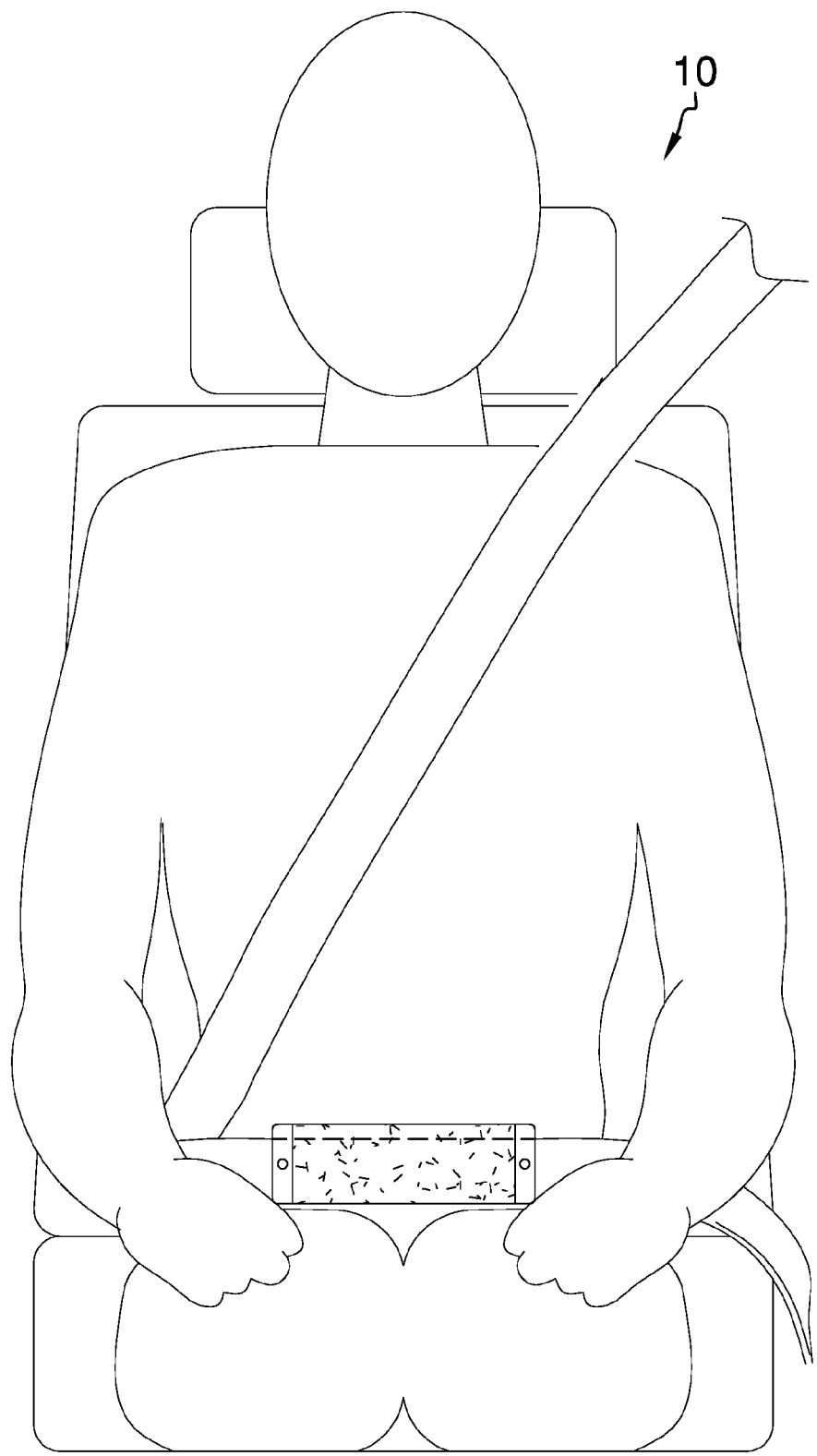
FIG. 6 is an in use view.

With reference now to the drawings, and in particular FIGS. 1 through 6 thereof, an example of the instant expandable protective covering for a seatbelt employing the principles and concepts of the present expandable protective covering for a seatbelt and generally designated by the reference number 10 will be described.

Referring to FIGS. 1 through 6 the present expandable protective covering for a seatbelt 10 is illustrated. The expandable protective covering for a seatbelt 10 includes a substantially rectangular seatbelt cover 20 having an expandable middle portion 22 disposed between a pair of end portions 24. The middle portion 22 of the seatbelt cover is optionally a foam material and has an expandable length that is optionally in a range of 10 inches to 32 inches. Each of the pair of end portions 24 of the seatbelt cover 20 is optionally rubberized. Each of the middle portion 22 and the pair of end portions 24 has a flattened top side 26 and a flattened bottom side 28. The stretchable middle portion 22 has an accordion shaped front side 30 and an accordion shaped back side 32, and each of the pair of end portions 24 has a flattened front surface 34 and a flattened back surface 36. A right end 38 of the pair of end portions 24 has a curved right top edge 40, a curved right bottom edge 42, and a right side 44. A left end 46 of the pair of end portions 24 has a curved left top edge 48, a curved left bottom edge 50, and a left side 52. A slot 54 is continuously disposed within the seatbelt cover 20 from the left side 52 of the left end 46 to the right side 44 of the right end 38 and from proximal each of the curved left top edge 48 of the left end 46 and the curved right top edge 40 of the right end 38 to each of the curved left bottom edge 50 of the left end 46 and the curved right bottom edge 42 of the right end 38. A height of the slot 54 substantially conforms to a height of a seatbelt 56, and a width of the slot 54 substantially conforms to a width of the seatbelt 56.

The expandable protective covering for a seatbelt 10 further includes a pair of locking mechanisms 58 including a right locking mechanism 60 and a left locking mechanism 62. Each of the right locking mechanism 60 and the left locking mechanism 62 has a cylindrical locking button 64 medially disposed on the front surface 34 of each of the right end 38 and the left end 46, respectively, and a tapered cylindrical release opening 66 medially disposed on the back surface 36 of each of the right end 38 and the left end 46, respectively. Each of the locking button 64 and the release opening 66 is continuously disposed through the front surface 34 and the back surface 36, respectively, to the slot 54. A circumference of the locking button 64 substantially conforms to a circumference of the release opening 66.

The seatbelt 56 is configured to be slidably disposed within the slot 54. The locking button 64 of each of the right locking mechanism 60 and the left locking mechanism 62 is selectively depressable into the release opening 66 of each of the right locking mechanism 60 and the left locking mechanism 62, respectively, in order to selectively secure the seatbelt 56 within the slot 54. The locking button 64 of each of the right locking mechanism 60 and the left locking mechanism 62 is also selectively releasable out of the release opening 66 of each of the right locking mechanism 60 and the left locking mechanism 62, respectively, in order to selectively release the seatbelt 56 from within the slot 54.

What is claimed is:

1. An expandable protective covering for a seatbelt comprising:
   a substantially rectangular seatbelt cover having an expandable middle portion disposed between a pair of end portions, each of the middle portion and the pair of end portions having a flattened top side and a flattened bottom side, the stretchable middle portion having an accordion shaped front side and an accordion shaped back side, each of the pair of end portions having a flattened front surface and a flattened back surface, wherein a right end of the pair of end portions has a curved right top edge, a curved right bottom edge, and a right side, wherein a left end of the pair of end portions has a curved left top edge, a curved left bottom edge, and a left side;
   a slot continuously disposed within the seatbelt cover from the left side of the left end to the right side of the right end and from proximal each of the curved left top edge of the left end and the curved right top edge of the right end to each of the curved left bottom edge of the left end and the curved right bottom edge of the right end;
   wherein a height of the slot substantially conforms to a height of a seatbelt;
   wherein a width of the slot substantially conforms to a width of the seatbelt; and
   a pair of locking mechanisms comprising a right locking mechanism and a left locking mechanism, each of the right locking mechanism and the left locking mechanism having a cylindrical locking button medially disposed on the front surface of each of the right end and the left end, respectively, and a tapered cylindrical release opening medially disposed on the back surface of each of the right end and the left end, respectively, wherein each of the locking button and the release opening is continuously disposed through the front surface and the back surface, respectively, to the slot;
   wherein a circumference of the locking button substantially conforms to a circumference of the release opening;
   wherein the seatbelt is configured to be slidably disposed within the slot;
   wherein the locking button of each of the right locking mechanism and the left locking mechanism is selectively depressable into the release opening of each of the right locking mechanism and the left locking mechanism, respectively, in order to selectively secure the seatbelt within the slot;
   wherein the locking button of each of the right locking mechanism and the left locking mechanism is selectively releasable out of the release opening of each of the right locking mechanism and the left locking mechanism, respectively, in order to selectively release the seatbelt from within the slot.

2. The expandable protective covering for a seatbelt of claim 1 wherein the middle portion of the seatbelt cover is a foam material.

3. The expandable protective covering for a seatbelt of claim 2 wherein each of the pair of end portions of the seatbelt cover is rubberized.

4. The expandable protective covering for a seatbelt of claim 3 wherein the middle portion of the seatbelt cover has an expandable length in a range of 10 inches to 32 inches.

* * * * *